United States Patent
Kief, Jr.

(10) Patent No.: US 7,219,596 B2
(45) Date of Patent: May 22, 2007

(54) COFFEE BREWER WITH LOADING AND EJECTION MECHANISM FOR A COFFEE CARTRIDGE

(75) Inventor: Eugene Richardson Kief, Jr., Reno, NV (US)

(73) Assignee: Carrier Commerical Refrigeration, Inc., Charlotte, NC (US)

( * ) Notice: Subject to any disclaimer, the term of this patent is extended or adjusted under 35 U.S.C. 154(b) by 264 days.

(21) Appl. No.: 10/921,683

(22) Filed: Aug. 19, 2004

(65) Prior Publication Data

US 2006/0037483 A1 Feb. 23, 2006

(51) Int. Cl.
*A47J 31/00* (2006.01)

(52) U.S. Cl. ..................... 99/289 R; 99/295

(58) Field of Classification Search .............. 99/289 R, 99/295, 290, 279, 302 R, 307
See application file for complete search history.

(56) References Cited

U.S. PATENT DOCUMENTS

| | | | |
|---|---|---|---|
| 3,223,023 A * | 12/1965 | Miller ........................ | 99/283 |
| 4,784,050 A * | 11/1988 | Cavalli, et al. ........... | 99/289 R |
| 6,079,315 A | 6/2000 | Beaulieu et al. | |
| 6,182,554 B1 * | 2/2001 | Beaulieu et al. .......... | 99/289 R |
| 6,345,570 B1 * | 2/2002 | Santi ........................ | 99/289 R |
| 6,955,116 B2 * | 10/2005 | Hale ........................... | 99/295 |
| 6,966,251 B2 * | 11/2005 | Yoakim ....................... | 99/295 |
| 7,063,238 B2 * | 6/2006 | Hale ........................... | 222/325 |

* cited by examiner

Primary Examiner—Reginald L. Alexander
(74) Attorney, Agent, or Firm—Carlson, Gaskey & Olds

(57) ABSTRACT

A coffee brewer includes a drawer having an upper cartridge shell and a lower cartridge shell that enclose a coffee cartridge. Before the drawer is opened, an operator pulls an arm to rotate the upper cartridge shell relative to the lower cartridge shell. As the drawer is pulled, a slidable track moves relative to a fixed track, and the upper cartridge shell is biased upwardly. An ejector arm on the coffee brewer engages an ejector blade on the lower cartridge shell and biases the lower coffee shell downwardly to eject the used coffee cartridge into a used cartridge bin. As the drawer continues to open, the lower cartridge shell returns to the original position. A new coffee cartridge can then be added to the lower cartridge shell. The drawer is then closed and the brewing process can begin.

16 Claims, 6 Drawing Sheets

COFFEE BREWER WITH LOADING AND EJECTION MECHANISM FOR A COFFEE CARTRIDGE

BACKGROUND OF THE INVENTION

The present invention relates generally to a coffee brewer including a mechanism to eject a used coffee cartridge from a drawer and into a used cartridge bin after brewing.

Coffee brewers are used to make coffee. A desired amount of coffee grounds are usually scooped out of a coffee container and manually added to a metal or paper filter. Pressurized hot water flows into and through the filter, and the coffee grounds flavor the hot water to form coffee. The coffee then collects in a coffee pot for serving. After brewing is complete, the used coffee grounds are discarded. If a paper filter is used, the filter and coffee grounds are thrown out together. If a metal filter is used, the coffee grounds are thrown out and the metal filter is cleaned before reusing.

Coffee cartridges have also been employed in coffee brewers. A coffee cartridge includes a predetermined amount of coffee contained within a sealed porous paper shell. The coffee cartridge is manually added to the coffee brewer. When brewing is complete, the entire coffee cartridge is manually removed from the coffee brewer and discarded. A new coffee cartridge can then be added to the coffee brewer to make a fresh pot of coffee. A drawback to prior coffee cartridges is that they must be manually removed from the coffee brewer and thrown away. This can be messy because the coffee cartridge is wet and can drip and stain the surfaces surrounding the coffee pot.

Hence, there is a need in the art for a coffee brewer that automatically ejects a coffee cartridge from the coffee brewer and overcomes the shortcomings and drawbacks of the prior art.

SUMMARY OF THE INVENTION

A coffee brewer includes a body portion and a drawer moveable between a closed position and an open position. The drawer includes an upper cartridge shell and a lower cartridge shell that contain a coffee cartridge. The drawer further includes a slidable track that is slidable relative to a fixed track when the drawer moves between the open position and the closed position. The lower cartridge shell includes two pins that are each received in a slot on each side of the slidable track.

The lower cartridge shell includes two lugs, and the upper cartridge shell includes two notches. When the drawer is closed, the lugs are received in the notches, securing the upper cartridge shell and the lower cartridge shell together. After the brew cycle has ended and the used coffee cartridge is to be discarded, an arm is pulled to rotate the upper cartridge shell relative to the lower cartridge shell and remove the lugs from the notches.

The drawer is then pulled towards the user, and the slidable track moves relative to the fixed track. The lugs of the lower cartridge shell are not received in the notches of the upper cartridge shell, and the upper cartridge shell can pivot upwardly relative to the lower cartridge shell. As the slidable track moves, a projection on the slidable track engages the upper cartridge shell to bias the upper cartridge shell upwardly. A resilient member also assists in biasing the upper cartridge shell upwardly.

One of the pins of the lower cartridge shell include an ejector blade. As the drawer is pulled forward, an ejector arm pivotally attached to the body portion engages the ejector blade, pivoting the lower cartridge shell downwardly relative to the slidable track. The used coffee cartridge in the lower cartridge shell is ejected and lands in a used cartridge bin. As the slidable track and the lower cartridge shell continue to move, the ejector blade disengages from the ejector arm. The lower cartridge shell engages a projection on the fixed track, biasing the lower cartridge shell to the original position. The weight of a spout on the lower cartridge shell also assists in biasing the lower cartridge back to the original position. A new coffee cartridge is added to the lower cartridge shell, and the drawer is closed. The coffee brewing cycle can then begin again.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
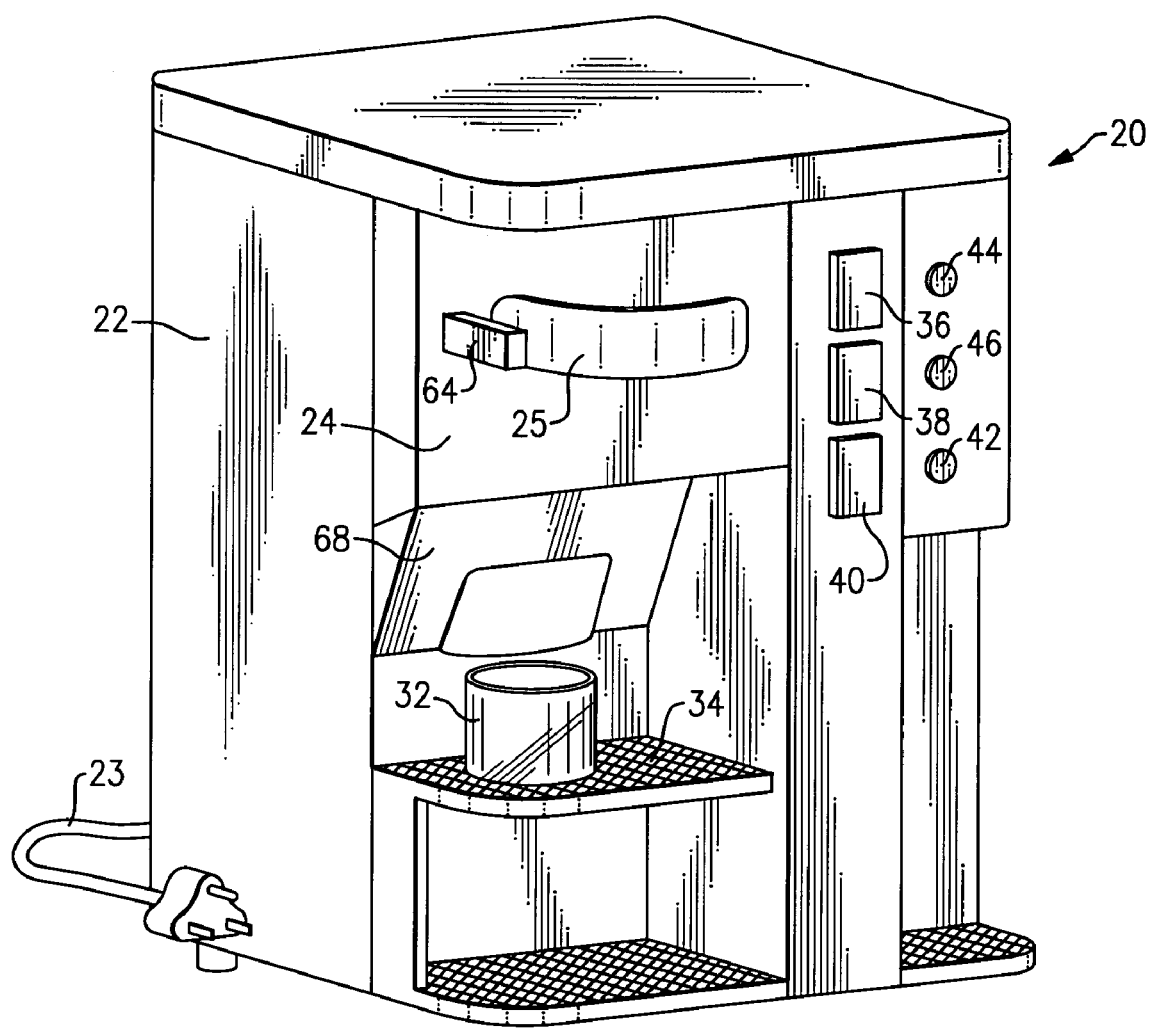
FIG. 1 illustrate a coffee brewer of the present invention.

FIG. 1 schematically illustrates the coffee brewer 20 of the present invention. The coffee brewer 20 includes a cord 23 that is plugged into an electrical source (not shown) that powers the coffee brewer 20. The coffee brewer 20 includes a body portion 22 and a slidable drawer 24 that holds a coffee cartridge 26 (shown in FIG. 7). The coffee cartridge 26 is a porous paper shell that contains ground coffee. An operator pulls a handle 25 to move the drawer 24 between an open position and a closed position. A hot water tank (not shown) stores water that is heated and filtered through the coffee cartridge 26 to make coffee.

When an operator wants to begin a brew cycle, the operator presses a brew switch 36. The brew switch 36 can be pressed by the operator to begin and end the coffee brewing cycle and program the coffee brewer 20 to brew the appropriate volume of coffee. The water in the hot water tank is heated by a heater (not shown) and pressurized. The heated water flows through the coffee cartridge 26 in the drawer 24 and forms coffee. The coffee flows through a lower spout 91 (shown in FIG. 6) and collects in a coffee pot 32 supported on a shelf 34.

Volume select switches 38 and 40 can be pressed to adjust the volume of coffee brewed. The coffee brewer 20 also includes a hot water dispense switch 42. The hot water dispense switch 42 is pressed by an operator to dispense hot water from the coffee brewer 20 that does not flow through the coffee cartridge 26. The hot water dispensed can be used to make other hot beverages, such as tea, etc.

When the coffee is ready to brew and the water in the hot water tank is heated, a ready to brew light 44 is illuminated. The coffee brewer 20 also includes a bin indicator light 46 that is illuminated when a used cartridge bin 68 is full of used coffee cartridges 26, indicating that used cartridge bin 68 needs to be emptied.

Figure 2:
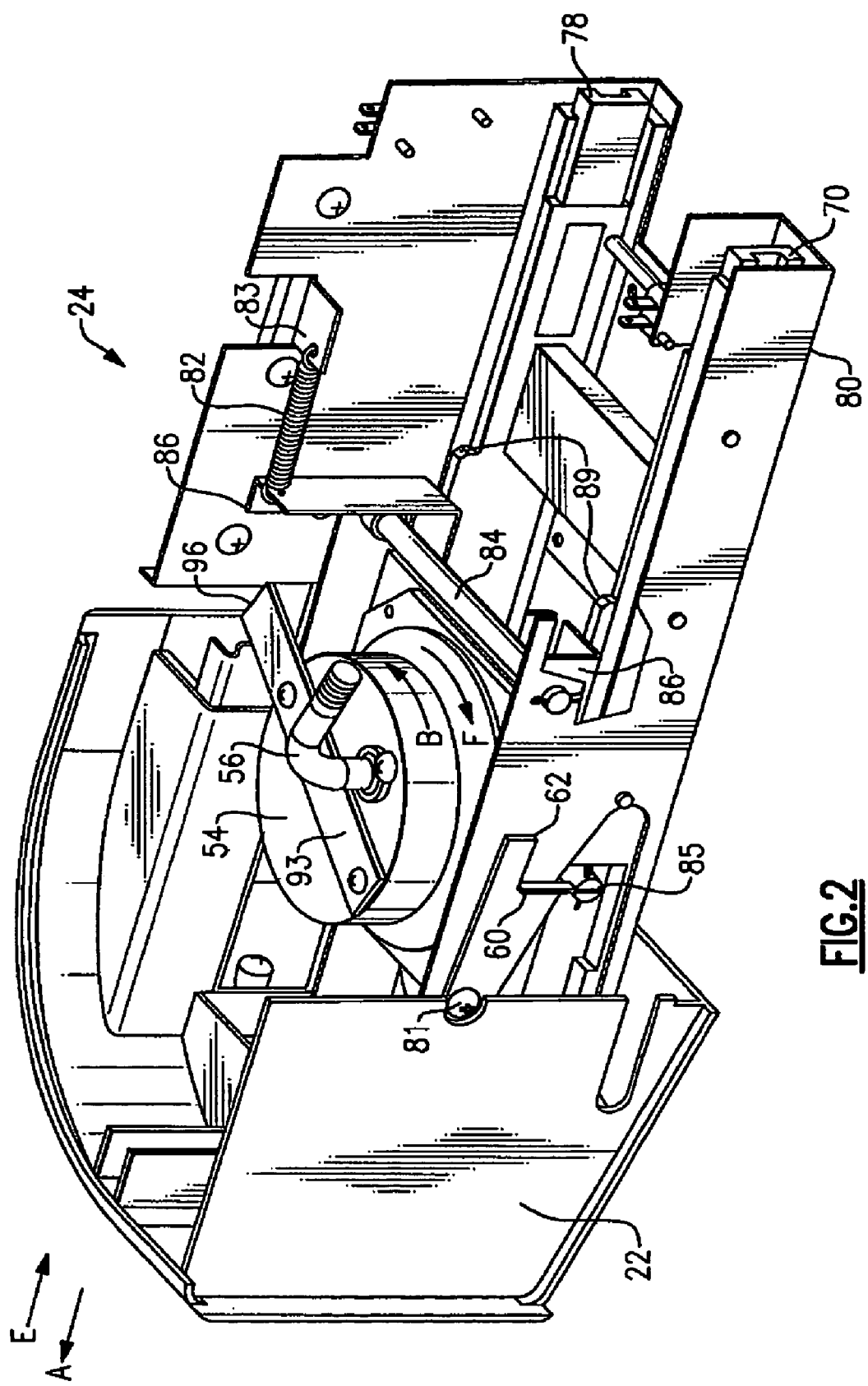
FIG. 2 illustrates internal components of a drawer of the coffee brewer in the closed position.

FIG. 2 illustrates the internal components of the drawer 24 in the closed position. In the closed position, an upper cartridge shell 54 and a lower cartridge shell 52 enclose the coffee cartridge 26 in a compartment 27 (shown in FIGS. 3 and 4).

The drawer 24 includes a slidable track 78 that is slidable relative to a fixed track 80. When the drawer 24 moves between the open position and the closed position, the slidable track 78 moves relative to the fixed track 80. The lower cartridge shell 52 is pivotally connected to the slidable track 78 by pins 85.

Figure 3:
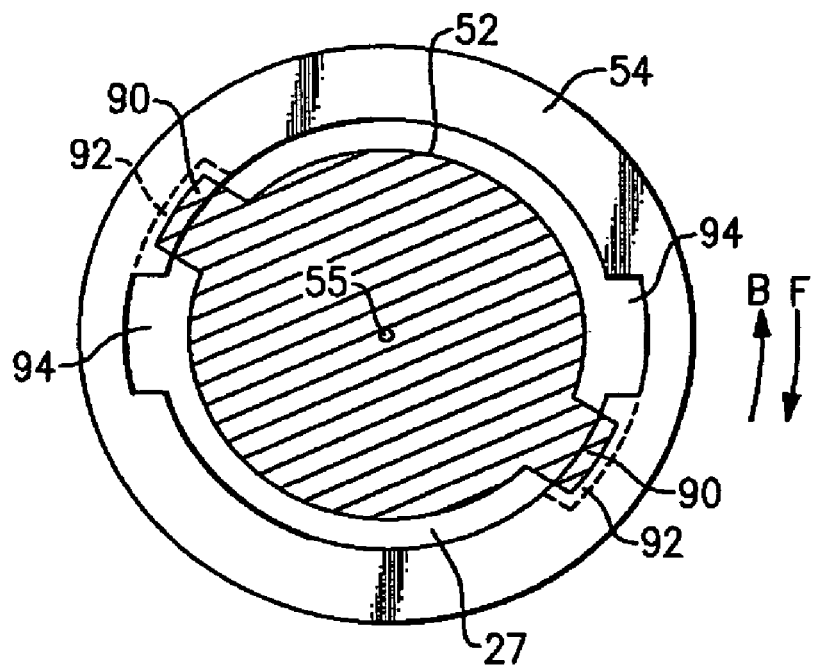
FIG. 3 illustrates a cross-sectional view of an upper cartridge shell and a lower cartridge shell of the drawer in the closed position.
Figure 4:
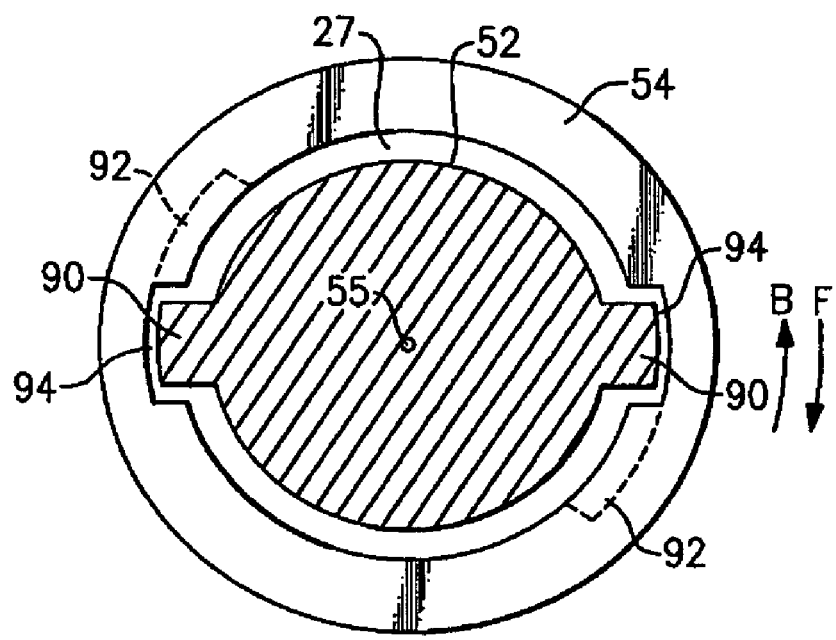
FIG. 4 illustrates a cross-sectional view of the upper cartridge shell and the lower cartridge shell of the drawer after rotation of the upper cartridge shell relative to the lower cartridge shell.

As shown in FIG. 3, the lower cartridge shell 52 includes two lugs 90, and the upper cartridge shell 54 includes two notches 92. When the drawer 24 is closed, the lugs 90 are received in the notches 92, securing the lower cartridge shell 52 and upper cartridge shell 54 together. Although two lugs 90 and two notches 92 are illustrated and described, it is to be understood that any number or lugs 90 and notches 92 can be employed. Additionally, the lower cartridge shell 52 can include the notches 92 and the upper cartridge shell 54 can include the lugs 90.

When the drawer 24 is closed, the slidable track 78 contacts a switch 70, indicating that the drawer 24 is closed. An electrical circuit is closed, allowing the coffee brewing process to begin. Hot water from the hot water tank is forced through an upper spout 56 and into the compartment 27 containing the coffee cartridge 26 defined between the upper cartridge shell 54 and the lower cartridge shell 52. The brewing process does not begin until the slidable track 78 contacts the switch 70.

The hot water from the hot water tank flows into the compartment 27 for brewing for a set amount of time. After brewing is complete, the coffee exits the compartment 27 through a water ejection disc 74 in the lower cartridge shell 52 and collects in the coffee pot 32. Preferably, the water ejection disc 74 is made of porous stainless steel.

After the brew cycle has ended, an arm 64 is pulled by the operator in direction A. The arm 64 includes a notch 96, and a bar 93 attached to the upper cartridge shell 54 is received in the notch 96. When the arm 64 is pulled, the arm 64 moves the bar 93 to rotate the upper cartridge shell 54 relative to the lower cartridge shell 52 in direction B. The arm 64 can be pulled linearly or can be rotated. Preferably, the arm 64 is pulled linearly. The upper cartridge shell 54 is rotated about a central axis 55 (shown in FIGS. 3 and 4). When the upper cartridge shell 54 is rotated, the lugs 90 in the lower cartridge shell 52 are disengaged from the notches 92 in the upper cartridge shell 54 and are received in exposed openings 94, shown in FIG. 4.

Alternately, the upper cartridge shell 54 can be rotated relative to the lower cartridge shell 52 by a motor. The motor moves the arm 64 linearly to rotate the upper cartridge shell 54 relative to the lower cartridge shell 52. Alternately, the arm 64 can be directly attached to the upper cartridge shell 54. In this example, the bar 93 is not needed as the arm 64 is directly attached to the upper cartridge shell 54.

Figure 5:
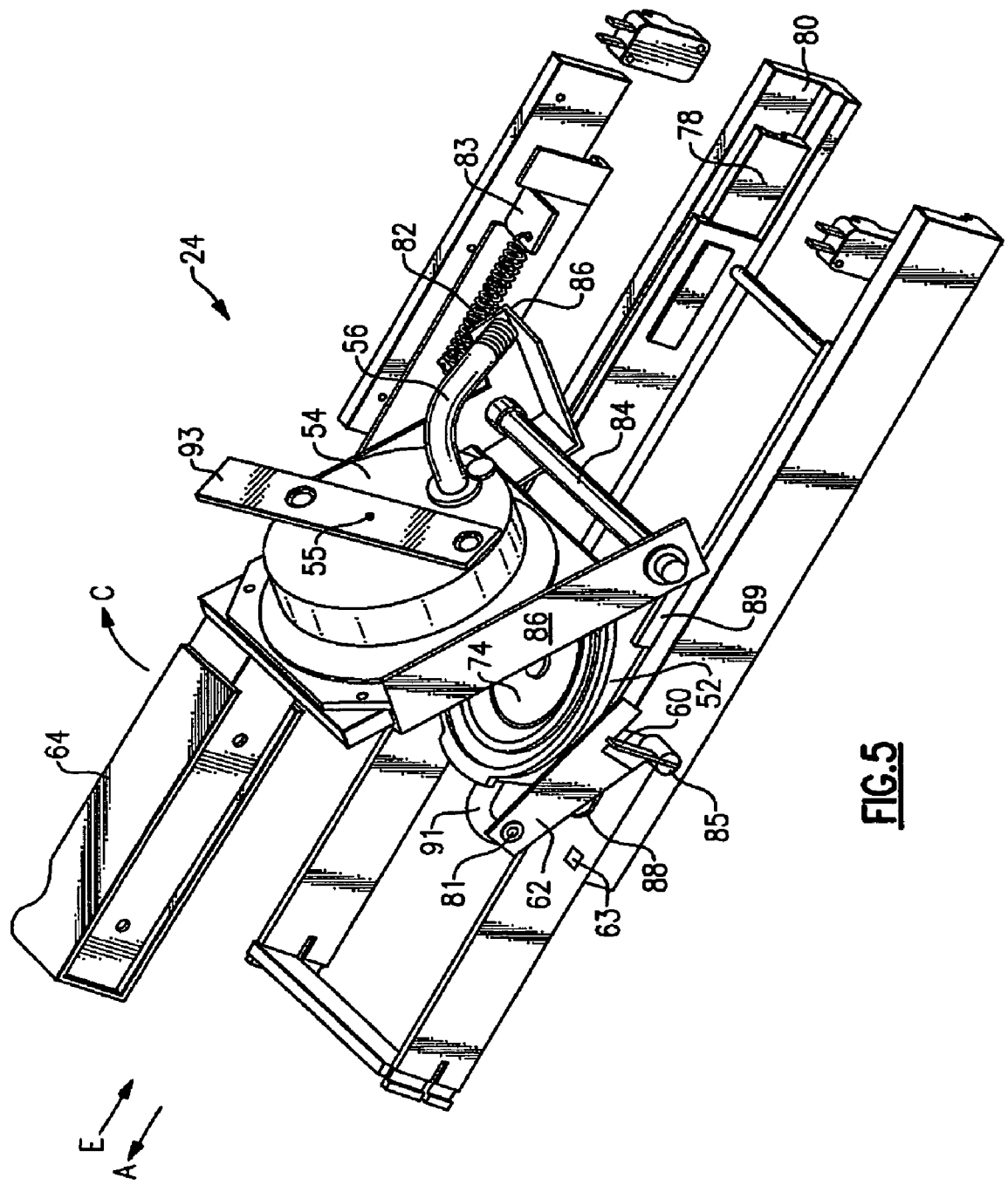
FIG. 5 illustrates the internal components of the drawer when the lower cartridge shell begins to lower to eject a coffee cartridge.

The drawer 24 is then pulled in the direction A to remove and replace the coffee cartridge 26. As the drawer 24 moves to the open position, the slidable track 78 moves relative to the fixed track 80. The slidable track 78 includes projections 89 that engages swing arms 86 of the upper cartridge shell 54 as the slidable track 78 moves in the direction A. Engagement of the projections 89 with the swing arms 86 biases the upper cartridge shell 54 upwardly in direction C, as shown in FIG. 5.

A resilient member 82, such as a spring, is attached to a tab 83 on the body portion 22 and to one of the swing arms 86 of the upper cartridge shell 54. As the upper cartridge shell 54 pivots about the pivot bar 84 in the direction C when the slidable track 78 is moving, the resilient member 82 collapses on itself and assists in biasing the swing arm 86, and therefore the attached upper cartridge shell 54, to an upper position. In one example, the upper cartridge shell 54 pivots approximately 40° from the original position.

Additionally, the resilient member 82 is preferably off center with respect to the central axis of the drawer 24. However, it is to be understood that the resilient member 82 can also be centered with respect to the central axis of the drawer 24.

The pins 85 extend from each side of the lower cartridge shell 52 and are aligned so that they are coaxial with respect to each other. Each pin 85 is received in a slot 88 on each side of the slidable track 78 and can move and rotate within the slot 88. The slot 88 is substantially diagonal with respect to the direction A. An ejector blade 60 is attached to one of the pins 85. An ejector arm 62 is pivotally attached to the body portion 22 of the coffee brewer 20 at a pivot 81.

Figure 6:
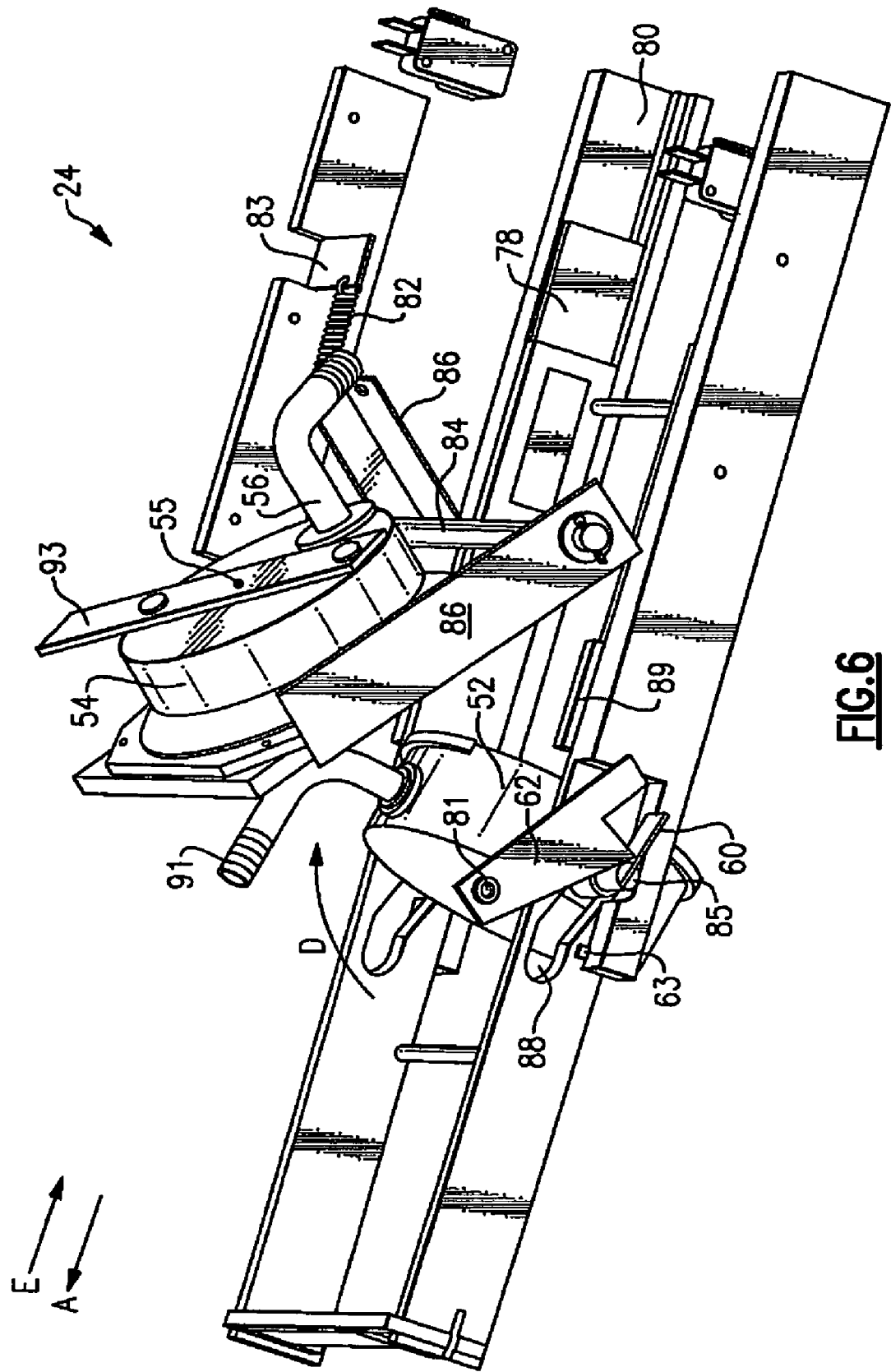
FIG. 6 illustrates the internal components of the drawer after the lower cartridge shell ejects the coffee cartridge.

As shown in FIG. 5, as the slidable track 78 is pulled in the direction A, the lower cartridge shell 52 also moves in the direction A. Eventually, the ejector blade 60 of the lower cartridge shell 52 engages the ejector arm 62 attached to the body portion 22, rotating the ejector blade 60 in a direction D about the pivot 81. As the ejector blade 60 pivots, the attached lower cartridge shell 52 also rotates in the direction D downwardly. In one example, within one inch of forward travel of the drawer 24 in the direction A, the lower cartridge shell 52 pivots downwardly in the direction D approximately 148°, as shown in FIG. 6. If a coffee cartridge 26 is received in the lower cartridge shell 52, the coffee cartridge 26 is ejected when the lower cartridge shell 52 is pivoted and lands in the used cartridge bin 68 (shown in FIG. 1).

Figure 7:
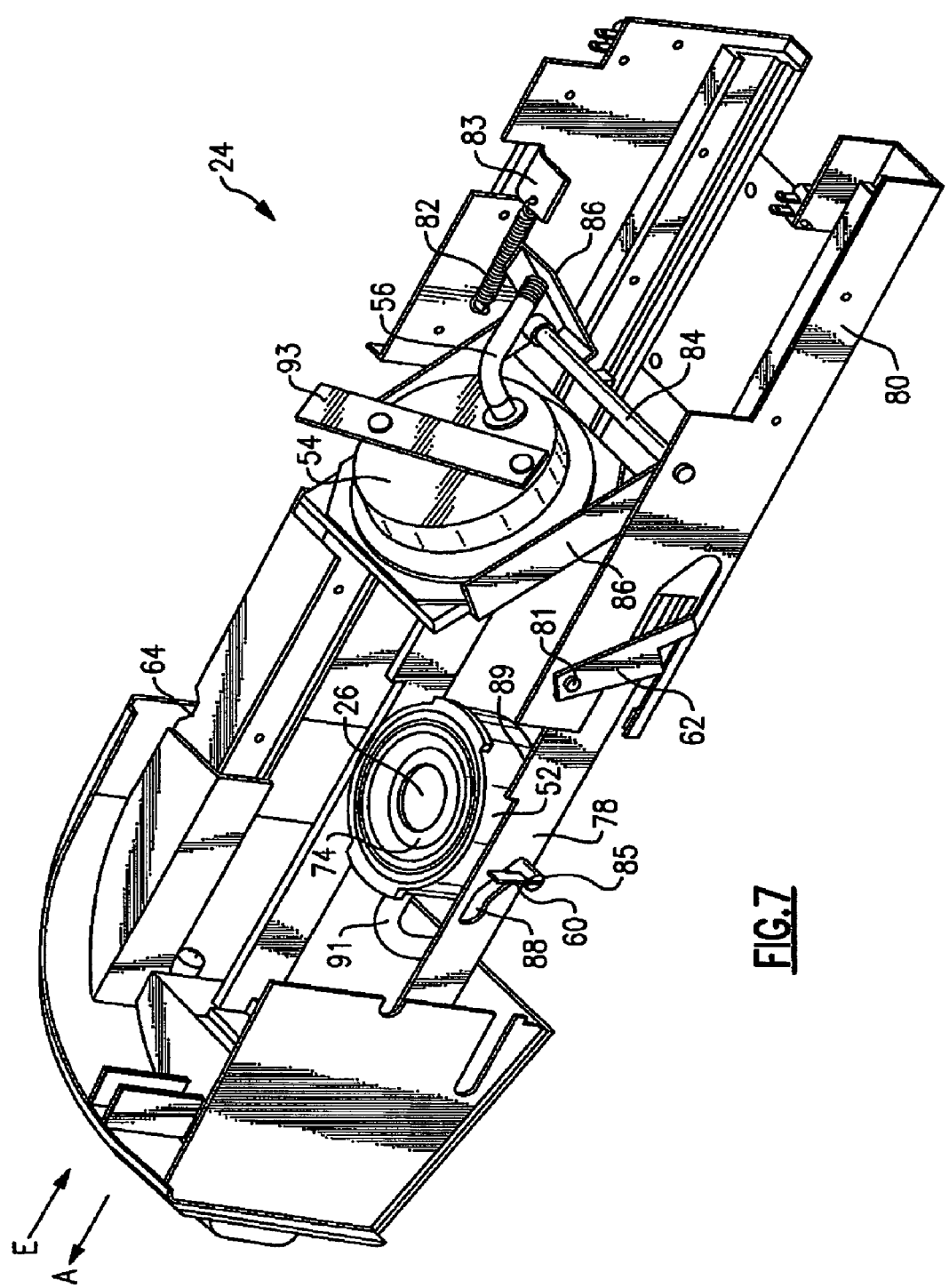
FIG. 7 illustrates the internal components of the drawer in the open position.

As shown in FIG. 7, as the slidable track 78 continues to move in the direction A, the ejector blade 60 disengages from the ejector arm 62, and the lower cartridge shell 52 returns to the original position to receive a new coffee cartridge 26. After the ejector blade 60 disengages from the ejector arm 62, the lower cartridge shell 52 contacts a projection 63 on the fixed track 80 that biases the lower cartridge shell 52 back to the original position. The weight of the lower spout 91 also assists in biasing the lower cartridge shell 52 back to the original position.

A new coffee cartridge 26 can then be added to the lower cartridge shell 52. The drawer 24 is pushed towards the body portion 22 in a direction E which is opposite to the direction A. As the drawer 24 moves, the ejector blade 60 engages the ejector arm 62 which pivots upwardly about the pivot 81. Therefore, the ejector arm 62 does not hinder movement of the slidable track 78 when moving in the direction B.

As the drawer 24 continues to close, the projection 89 on the slidable track 78 engages the swing arms 86 of the upper cartridge shell 54, biasing the upper cartridge shell 54 downwardly and stretching and storing energy in the resilient member 82. Once the drawer 24 is closed, the arm 64 is pushed inwardly towards the body portion 22, engaging the bar 93 and rotating the upper cartridge shell 54 relative to the lower cartridge shell 52 in a direction F which is substantially opposite to the direction B. The lugs 90 in the lower cartridge shell 52 are received in the notches 92 in the upper cartridge shell 54, and the coffee cartridge 26 is then secured in the compartment 27 between the lower cartridge shell 52 and the upper cartridge shell 54. The coffee brewer 20 can then be activated to begin the brew cycle and make coffee.

Alternately, the motor moves the upper cartridge shell 54. The arm 64 can also be directly connected to the upper cartridge shell 54 or can be rotated to rotate the upper cartridge shell 54.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A coffer brewer comprising:
   a drawer slidable between a closed position and an open position;
   a lower cartridge shell pivotable between an original lower cartridge shell position and a lowered position;
   an upper cartridge shell pivotable between an original upper cartridge shell position and a raised position;
   a pivot bar attached to the upper cartridge shell, wherein the upper cartridge shell pivots about the pivot bar; and
   a compartment defined between the lower cartridge shell and the upper cartridge shell when the lower cartridge shell is in the original lower cartridge shell position and the upper cartridge shell is in the original upper cartridge shell position wherein the lower cartridge shell and the upper cartridge shell pivot with a sliding movement of the drawer.

2. The coffee brewer as recited in claim 1 wherein a coffee cartridge is received in the compartment.

3. The coffee brewer as recited in claim 1 including a fixed track and a slidable track, wherein the slidable track is moveable relative to the fixed track to move the drawer between the closed position and the open position.

4. The coffee brewer as recited in claim 3 including a switch, wherein the slidable track contacts the switch when the drawer is in the closed position and the coffee brewer is operational when the slidable track contacts the switch.

5. The coffee brewer as recited in claim 3 wherein the lower cartridge shell is pivotably attached to the slidable track.

6. The coffee brewer as recited in claim 3 wherein the lower cartridge shell includes a pin and the slidable track includes a slot, and the pin is received in the slot to allow the lower cartridge shell to pivot between the original lower cartridge shell position and the lowered position.

7. The coffee brewer as recited in claim 6 including a housing and a pivotal arm attached to the housing, wherein the pin includes a projection, and the pivotal arm engages the projection of the pin as the slidable track moves between the closed position and the open position to pivot the lower cartridge shell from the original lower cartridge shell position to the lowered position.

8. The coffee brewer as recited in claim 1 wherein the upper cartridge shell pivots upwardly approximately 40° from the original upper cartridge shell position to the raised position.

9. The coffee brewer as recited in claim 1 wherein the lower cartridge shell pivots downwardly approximately 148° from the original lower cartridge shell position to the lowered position.

10. The coffee brewer as recited in claim 1 further including a slidable track including a projection and a swing arm attached to at least one end of the pivot bar, wherein the slidable track moves the drawer between the closed position and the open position, and the projection engages the at least one swing arm as the drawer moves from the closed position to the open position to bias the upper cartridge shell upwardly from the original upper cartridge shell position to the raised position.

11. A coffer brewer comprising:
    a drawer slidable between a closed position and an open position;
    a lower cartridge shell pivotable between an original lower cartridge shell position and a lowered position;
    an upper cartridge shell pivotable between an original upper cartridge shell position and a raised position;
    a compartment defined between the lower cartridge shell and the upper cartridge shell when the lower cartridge shell is in the original lower cartridge shell position and the upper cartridge shell is in the original upper cartridge shell position;
    a fixed track; and
    a slidable track moveable relative to the fixed track to move the drawer between the closed position and the open position, wherein the slidable track includes a projection that engages the upper cartridge shell as the drawer moves from the closed position to the open position to bias the upper cartridge shell upwardly from the original upper cartridge shell position to the raised position wherein the lower cartridge shell and the upper cartridge shell pivot with a sliding movement of the drawer.

12. The coffee brewer as recited in claim 11 including a housing and a resilient member having a first end and a second end, wherein the first end of the resilient member is attached to the housing and the second end of the resilient member is attached to the upper cartridge shell, and the resilient member biases the upper cartridge shell to the raised position when the upper cartridge shell moves from the original upper cartridge shell position to the raised position.

13. A coffer brewer comprising:
    a drawer slidable between a closed position and an open position;
    a lower cartridge shell pivotable between an original lower cartridge shell position and a lowered position, wherein the lower cartridge shell includes a central lower cartridge shell axis and one of a lug and a notch;
    an upper cartridge shell pivotable between an original upper cartridge shell position and a raised position, wherein the upper cartridge shell includes a central upper cartridge shell axis and the other of the lug and the notch, and the lug is received in the notch to prevent the lower cartridge shell and the upper cartridge shell from pivoting relative to each other, and rotation of one of the lower cartridge shell and the upper cartridge shell about the central lower cartridge shell axis and central upper cartridge shell axis, respectively, relative to the other of the lower cartridge shell and the upper cartridge shell removes the lug from the notch to allow the upper cartridge shell and the lower cartridge shell to pivot relative to each other, and a compartment defined between the lower cartridge shell and the upper cartridge shell when the lower cartridge shell is in the original lower cartridge shell position and the upper cartridge shell is in the original upper cartridge shell position wherein the lower cartridge shell and the upper cartridge shell pivot with a sliding movement of the drawer.

14. The coffee brewer as recited in claim 13 including a locking arm moveable between a locked position and an unlocked position, wherein the lug is received in the notch when the locking arm is in the locked position and the lug is not received in the notch when the locking arm is in the unlocked position.

15. The coffee brewer as recited in claim 14 wherein the locking arm includes an arm notch and the upper cartridge shell includes a bar attached to the upper cartridge shell that is received in the arm notch, and linear movement of the locking arm between the locked position and the unlocked position rotates the upper cartridge shell between the original upper cartridge shell position and a rotated position, and the lug is received in the notch when the upper cartridge shell is in the rotated position and the lug is not received in the notch when the upper cartridge shell is in the original upper cartridge shell position.

16. A coffer brewer comprising:

a drawer slidable between a closed position and an open position;

a lower cartridge shell pivotable between an original lower cartridge shell position and a lowered position;

an upper cartridge shell pivotable between an original upper cartridge shell position and a raised position; and a compartment defined between the lower cartridge shell and the upper cartridge shell when the lower cartridge shell is in the original lower cartridge shell position and the upper cartridge shell is in the original upper cartridge shell position, wherein the lower cartridge shell includes one of a lug and a notch and the upper cartridge shell includes the other of the lug and the notch, wherein the lug is received in the notch to prevent the lower cartridge shell and the upper cartridge shell from pivoting relative to each other, and wherein rotation of one of the lower cartridge shell and the upper cartridge shell relative to the other of the lower cartridge shell and the upper cartridge shell removes the lug from the notch to allow the upper cartridge shell and the lower cartridge shell to pivot relative to each other wherein the lower cartridge shell and the upper cartridge shell pivot with a sliding movement of the drawer.

* * * * *